United States Patent [19]
Fitzgerald et al.

[11] Patent Number: 5,871,787
[45] Date of Patent: Feb. 16, 1999

[54] LIQUID-COOLED WAX MOLD

[75] Inventors: Kenneth Ray Fitzgerald, Hallsville; James M. Fitzgerald, Marshall, both of Tex.

[73] Assignee: Magnum Machine and Manufacturing Company, Marshall, Tex.

[21] Appl. No.: 864,786

[22] Filed: May 29, 1997

[51] Int. Cl.[6] .......................... B29C 33/04; B29C 33/38
[52] U.S. Cl. ............................ 425/552; 249/79; 249/81; 249/120; 249/126; 249/163; 249/168; 249/169
[58] Field of Search ................................ 249/79, 81, 119, 249/120, 126, 129, 163, 165, 168, 169, 192, 219.1; 425/552

[56] References Cited

U.S. PATENT DOCUMENTS

| | | | |
|---|---|---|---|
| 1,760,282 | 5/1930 | Pedersen | 249/169 |
| 2,087,593 | 7/1937 | English et al. | 249/81 |
| 2,154,234 | 4/1939 | Eppensteiner | 249/165 |
| 3,881,856 | 5/1975 | Fougea | 249/81 |
| 4,003,687 | 1/1977 | Hedin | 249/79 |
| 4,159,100 | 6/1979 | Landowski | 249/165 |
| 4,260,360 | 4/1981 | Holmes et al. | 249/79 |
| 4,981,428 | 1/1991 | Herring, Sr. | 249/165 |

*Primary Examiner*—Khanh P. Nguyen
*Attorney, Agent, or Firm*—Akin, Gump, Strauss, Hauer & Feld, L.L.P.

[57] ABSTRACT

A liquid cooled wax mold includes a generally rectangular two-part heat transfer member formed by separable metal plates. One of the plates includes elongated parallel vertically-extending heat transfer bars or fins defining parallel liquid coolant flow passages. The coolant flow passages interconnect spaced apart liquid coolant distribution and collection passages which are, respectively, connected to coolant inlet and discharge passages. A dam is interposed between the coolant collection passage and the discharge passage to provide for purging air or coolant vapor from the coolant flow circuit. Elongated circular cross section seal strips are disposed in grooves formed in one of the plate members to provide a fluid-tight assembly of the heat transfer member. Mold endwall and bottomwall members are secured to the heat transfer member by socket head machine screw fasteners. Locating shoes on the endwall members align the mold with an adjacent mold in a molding apparatus wherein the molds are stacked side-by-side to form open-top mold cavities. Opposed support handles are mounted on the mold endwall members, respectively.

23 Claims, 6 Drawing Sheets

LIQUID-COOLED WAX MOLD

FIELD OF THE INVENTION

The present invention pertains to a multi-part liquid-cooled mold, particularly useful for the manufacture of slabs or blocks of industrial and food grade wax.

BACKGROUND

In the manufacture of industrial and food grade wax and similar substances, it is conventional practice to form the wax in generally rectangular slabs or blocks having a weight of about ten to twelve pounds, for example, whereby these slabs or blocks may be shipped to end-users of the wax such as manufacturers of milk and other food containers, candles, chewing gum and adhesives, for example. The wax slabs or blocks are typically formed in molds which are stacked in a side-by-side manner in a molding machine for receiving molten wax and whereby the wax slabs may be released from the molds after the wax has solidified and cooled to a temperature which will permit handling and shipping.

In order to improve the efficiency and speed of the molding process, wax molds are preferably cooled by a liquid coolant, including water or a mixture of water and other coolant fluids, such as ethylene glycol, for example. One problem associated with prior art liquid cooled wax molds pertains to the non-uniform cooling effect resulting in unacceptably long periods of time during which the wax slabs must be kept in the mold. The non-uniform cooling of the wax slabs also tends to produce distorted and non-uniform slab shapes and weights or, hardened wax sticking to the mold. Moreover, non-uniform heat transfer between the wax and the mold causes stresses to be imposed on the mold and boiling of the mold coolant, both often resulting in damage to the mold structure and leakage of coolant from the flow passages in the mold.

Still further, there has been a desire to provide wax molds which are constructed to facilitate easy cleaning and replacement of worn or damaged parts, when necessary, without replacing the entire mold structure itself. Solutions to the above-mentioned problems as well as the provision of certain desirable features have been achieved with an improved liquid-cooled wax mold in accordance with the invention.

SUMMARY OF THE INVENTION

The present invention provides an improved liquid-cooled mold, particularly adapted for molding slabs or blocks of wax substances.

In accordance with one important aspect of the invention, a liquid cooled wax mold is provided which is characterized by a heat transfer member which includes a plate forming a wall of a cavity or cavities of the mold and which member also forms a wall of molding cavities of an adjacent mold in an assembly of plural wax molds. The heat transfer member is preferably formed of two, separable, metal, generally planar plate members in one of which coolant flow passages are formed which provide uniform flow of liquid coolant through the mold, while avoiding creating spaces in which coolant becomes vaporized or coolant vapor or air becomes trapped. In particular, the mold heat transfer member includes an arrangement of coolant flow passages which assures uniform filling of the passages with coolant and flow of coolant through the mold.

In accordance with another aspect of the present invention a liquid cooled wax mold is provided which is formed of separable plate members which define liquid coolant flow passages wherein the separable plate members are secured together by machine screws arranged in a pattern which minimizes distortion or warping of one member with respect to the other to thereby prevent leakage of coolant from the mold. Coolant leakage is minimized and ease of disassembly and reassembly of the heat transfer member is also provided by a resilient elongated seal member which is disposed in machined or molded-in grooves formed in one of the plate members and engageable with the other plate member to prevent unwanted leakage of coolant. The resilient seal members are preferably formed of a cylindrical cross-section elastomeric, o-ring type seal material.

The present invention further provides an improved liquid-cooled wax mold which is formed of the aforementioned plate members and plural separable elongated members which define opposed endwalls and a bottomwall of the mold cavity and an intermediate wall which divides the mold cavity into two subcavities. The separable bottom and endwall members are connected to the heat transfer member by conventional mechanical fasteners which also secure the plates of the heat transfer member together along at least three sides thereof.

The improved wax mold of the present invention also includes opposed locating lugs or shoes which provide for locating each mold in a predetermined position stacked against an adjacent mold to form the mold cavities, and a separable wear plate disposed across the top of the mold adjacent the cavity opening to protect and minimize wear on the mold caused by a striking knife used to strike excess wax from the mold.

Still further, the improved liquid cooled wax mold is provided with support structure including opposed handle members which are adapted to be easily grasped for handling the mold and are mounted on the mold endwall members in positions such as to allow the mold to tilt to prevent the wax slabs from falling out of the mold while it is mounted in a molding apparatus but separated from an adjacent mold.

Those skilled in the art will further appreciate the above-mentioned advantages and superior features of the invention together with other important aspects thereof upon reading the detailed description which follows in conjunction with the drawings.

DESCRIPTION OF THE PREFERRED EMBODIMENTS

In the description which follows like parts are marked throughout the specification and drawings with the same reference numerals, respectively. The drawing figures are not necessarily to scale and certain features may be shown in generalized or schematic form in the interest of clarity and conciseness.

The liquid cooled wax mold of the present invention is typically utilized in a molding process wherein a plurality of molds are stacked in a side-by-side manner in an apparatus having a support frame for the molds and also including liquid coolant supply and return conduits wherein liquid coolant may be conducted to the molds from a source and then returned from the molds for discharge or for heat exchange and then recirculated back through the respective molds. The aforementioned apparatus also includes a press member which engages the side-by-side stacked molds and holds them in a working position while molten wax is poured into the molds, the wax is then allowed to cool and solidify and the press member is then released and retracted so that the individual molds may be separated from each other sufficiently to withdraw the slabs or blocks of hardened wax therefrom.

Figure 1:
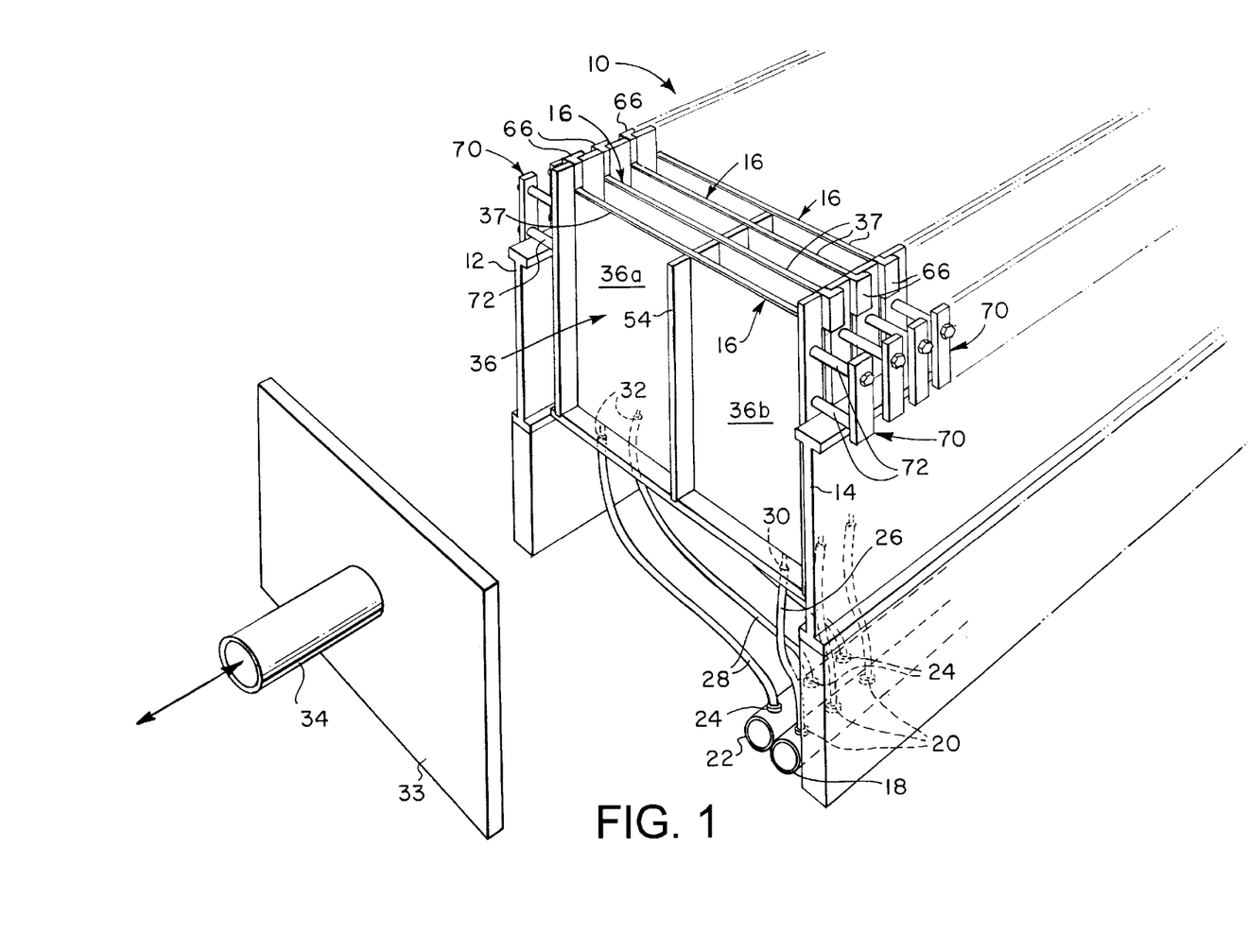
FIG. 1 is a perspective view of a portion of a wax molding apparatus showing a wax mold in accordance with the invention mounted therein in a working position.

Referring to FIG. 1, there is illustrated an apparatus of the aforementioned type, generally designated by the numeral 10. The apparatus 10 is preferably characterized by spaced apart, generally parallel support rails 12 and 14 between which are stacked a plurality of molds in accordance with the invention, each generally designated by the numeral 16. A liquid coolant supply manifold 18 extends along the apparatus 10 and is provided with a plurality of spaced apart branch conduits 20, one being associated with each of the stacked molds 16. A liquid coolant return manifold 22 is disposed adjacent the manifold 18 and is also furnished with spaced apart branch conduits 24, each being placed generally adjacent to the respective branch conduits 20 of the coolant supply manifold. Flexible coolant supply and return conduits 26 and 28 are connected to the respective branch conduits 20 and 22 and are connected to corresponding coolant supply and return conduits 30 and 32, one set shown, on each of the molds 16.

When the molds 16 are stacked side-by-side in the manner illustrated in FIG. 1, a press apparatus including a support plate 33 supported by an actuating rod 34 is moved into engagement with the end mold 16 of the side-by-side stacked molds wherein each of the molds is then pressed into tight engagement with an adjacent mold to form respective mold cavities 36 which may be filled with molten wax. The wax is then allowed to harden and cool and when a sufficient hardened and cooled condition exists the press apparatus 33, 34 is retracted to permit the individual molds 16 to be separated one from another by sliding them along the frame rails 12 and 14 and the aforementioned slabs or blocks of wax are then removed from the cavities 36.

Figure 2:
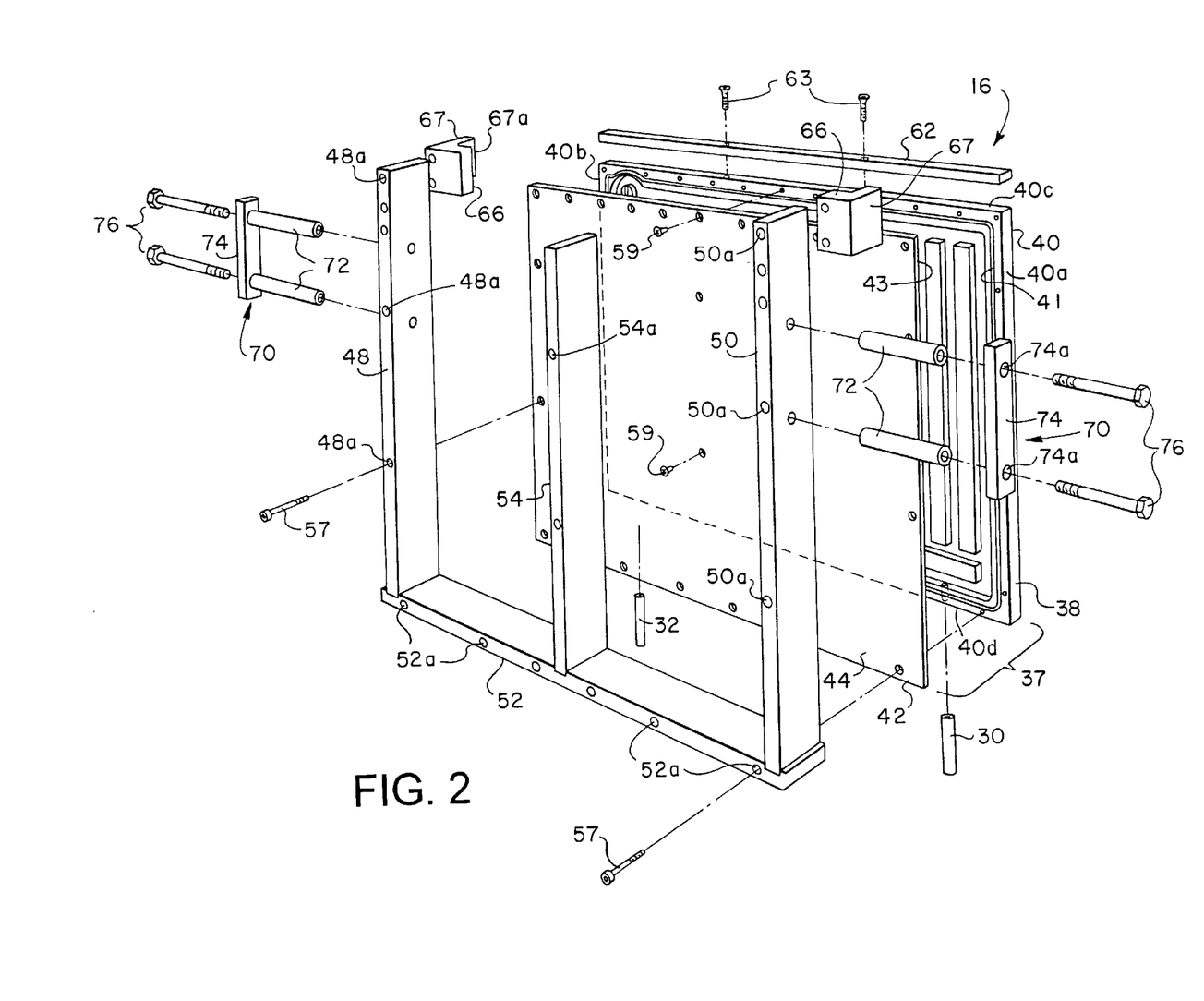
FIG. 2 is an exploded perspective view of a preferred embodiment of a liquid-cooled wax mold in accordance with the invention.
Figure 5:
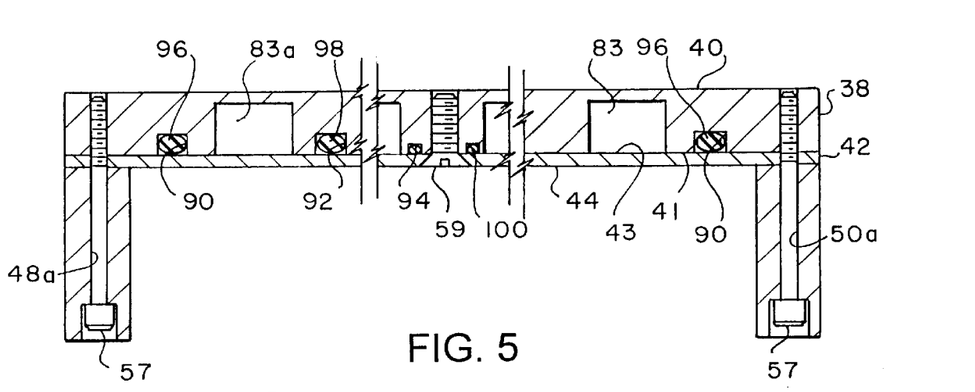
FIG. 5 is a detail section view taken generally from the line 5—5 of FIG. 4.

Referring now to FIG. 2, there is illustrated an exploded perspective view of a preferred embodiment of a liquid cooled wax mold 16. The wax mold 16 includes a generally rectangular, planar heat transfer member 37 which forms a sidewall of the mold 16 and a sidewall of an adjacent mold when the molds are stacked side-by-side in the apparatus 10. The heat transfer member 37 includes a first, generally rectangular plate member 38 having an outer sidewall surface 40, and a parallel inner sidewall surface 41, see also FIGS. 5 and 6. The plate member 38 is delimited by opposed, parallel end edges 40a and 40b and generally parallel top and bottom edges 40c and 40d. A correspondingly shaped cover plate member 42 is releasably connected to the plate member 38 and has opposed planer wall surfaces 43 and 44. The end edges and top and bottom edges of the member 42 are generally aligned with the corresponding edges 40a, 40b, 40c and 40d of the plate member 38 when the members 38 and 42 are assembled one to the other. The sidewall 44 of the plate member 42 forms one wall of the cavity 36 of the mold 16. By way of example, for a typical liquid-cooled wax mold in accordance with the invention the plate member 38 is of approximately 0.50 inches thickness and has an overall length between edges 40a and 40b of about 25.30 inches and an overall height between edges 40c and 40d of about 19.50 inches. The plate member 42 has the same length and generally the same height but is typically of a thickness of about 0.13 inches.

The mold 16 is further characterized by opposed, generally parallel upstanding endwall members 48 and 50 which are formed from generally rectangular metal plate or bar stock and preferably of the same material as the plate members 38 and 42. Members 48 and 50 are adapted to be contiguous with a bottomwall member 52 extending between the members 48 and 50 and operable to be releasably secured to the heat transfer member 37, together with endwall members 48 and 50. The mold cavity 36 may be divided by an elongated rectangular divider member 54 wherein two subcavities 36a and 36b are formed, see FIG. 1, preferably of equal size and open at a top end adjacent said top edge 40c of member 37. Members 48, 50, 52 and 54 may have the same width and thickness. Additional divider members, not shown, may be provided to form slabs or blocks of various shapes and sizes. Moreover, the shape of the mold cavity or cavities may be modified as desired.

Referring further to FIG. 2, each of the members 48, 50, 52 and 54 is provided with suitably spaced apart stepped or counterbore type fastener receiving bores 48a, 50a, 52a and 54a, respectively, for receiving threaded fasteners for securing these members in assembly with the plate members 38 and 42. Fasteners which are receivable in the stepped bores 48a, 50a, 52a and 54a are preferably of a type which can be recessed within the stepped bores and are, as illustrated by way of example, conventional socket head machine screws 57. In addition, the plate member 42 is secured to the plate member 38 by a plurality of conventional countersunk machine screws 59, as shown in FIG. 2. Accordingly, the screw fasteners 57 are operable to secure the mold members 38, 42, 48, 50, 52 and 54 in assembly with each other and additional countersunkhead machine screws 59 are operable to secure the members 38 and 42 together generally along a line adjacent and parallel to the top edge 40c of member 38. Still further, an elongated generally rectangular rub rail member 62 is detachably secured to the top edge 40c of member 38 by a plurality of countersunk head machine screws 63, as illustrated.

Figure 7:
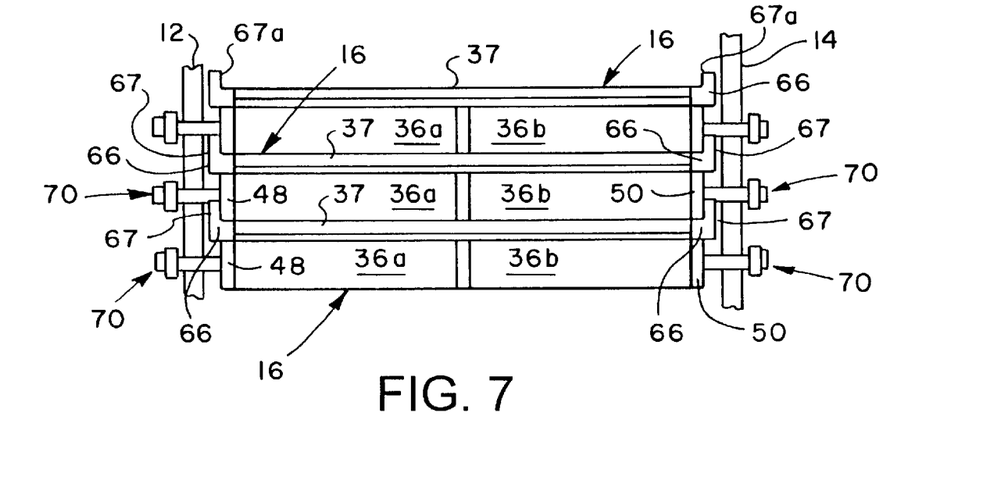
FIG. 7 is a detail plan view showing how adjacent molds are located relative to each other by the respective sets of locating lugs.

Referring still further to FIG. 2, the overall length of the endwall members 48 and 50 is such that these members extend above the top edge 40c of heat transfer member 37 and are adapted to support removable, generally L-shaped locating lug or shoe members 66. Each of the lug members 66 includes an arm 67 projecting normal to the surfaces of the mold walls 40 and 44 and the lug members are operable to engage the respective endwall members 48 and 50 of an adjacent mold, see FIG. 7, to align the molds 16 with each other in the apparatus 10 and to form the respective mold cavities 36. Each of the arms 67 preferably includes a beveled edge 67a which is operable to facilitate engagement of one mold with the adjacent mold as the molds are pressed together and to align each mold in the side-by-side stacked relationship illustrated. The locating lugs 66 are secured to the endwall members 48 and 50 by selected ones of the machine screws 57.

Referring further to FIG. 2, the mold 16 is provided with opposed support and carrying handles 70 comprising spaced apart laterally projecting post members 72 and grip members 74 which are secured together and to the opposed endwall members 48 and 50 by conventional hexhead machine screws 76. In this regard the members 72 are preferably formed as generally cylindrical tubes while the members 74 have suitable bores 74a formed therein for receiving the screws 76 and wherein the screws are threadedly engageable with suitable threaded bores formed in the endwall members 48 and 50.

Those skilled in the art will recognize from the foregoing description that when the molds 16 are stacked side-by-side in the apparatus 10 they are oriented such that the cavities 36a, 36b are open at the top of the mold, as defined by the top side edge 40c and the rub rail 62, and the cavities are closed at the bottom by the bottomwall member 52, and at the ends by the endwall members 48 and 50. Each cavity 36a, 36b is closed at its opposite sides by a wall 44 of one mold and a wall 40 of the adjacent mold. The orientation of the cavities 36a, 36b is such that, it is preferable when molding the aforementioned wax slabs or blocks, there be a uniform cooling effect or heat transfer between the molten wax and the surfaces of the walls 40 and 44, in particular. In this regard the mold 16 advantageously utilizes a coolant flow circuit which provides uniform heat transfer between the material in the cavities 36a and 36b and the heat transfer member 37 while avoiding adverse temperature gradients over the surfaces of walls 40 and 44.

Figure 3:
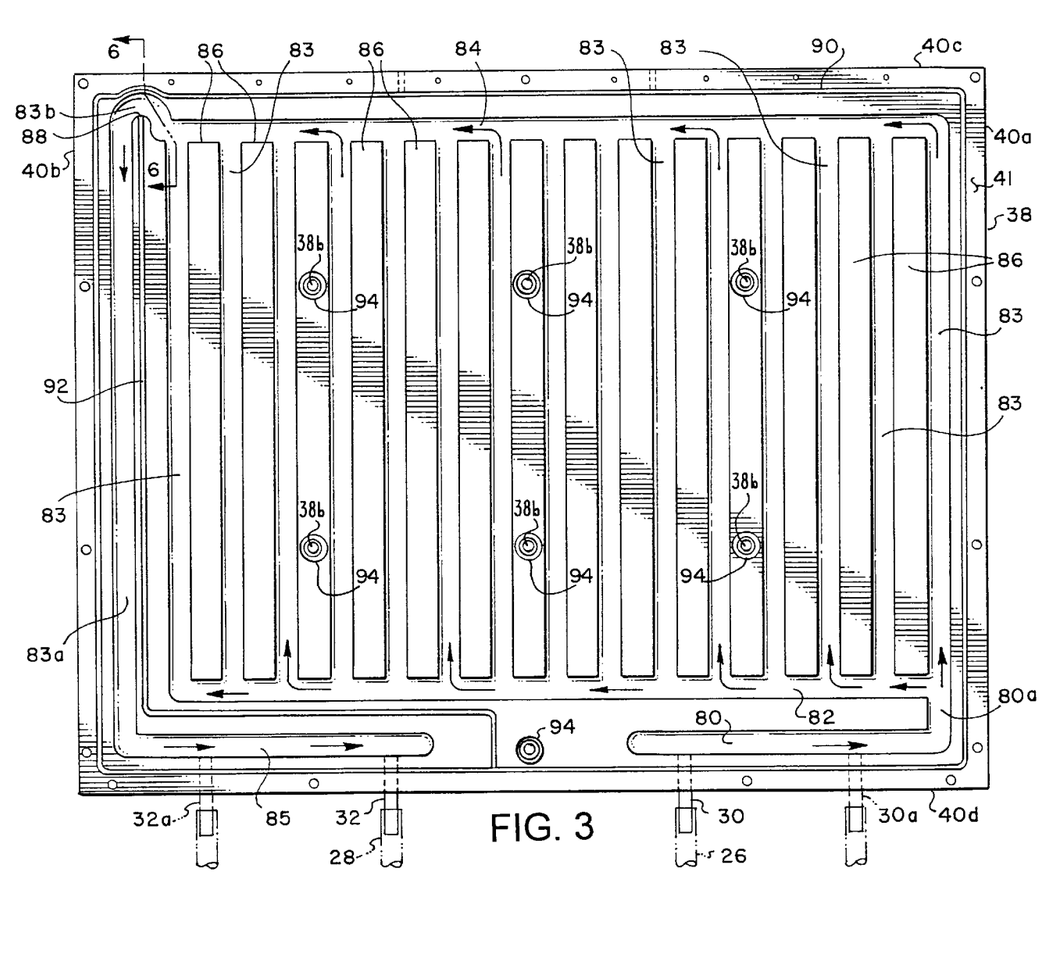
FIG. 3 is a plan view of one plate of the heat transfer member showing a preferred arrangement of coolant passages formed therein.
Figure 4:
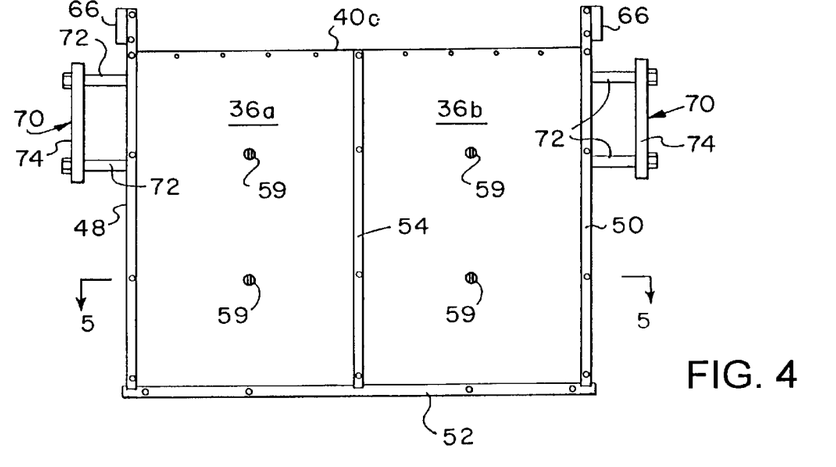
FIG. 4 is a side elevation of the wax mold shown in FIGS. 1 and 2.

Referring to FIG. 3, there is illustrated a plan view of the member 38 with the member 42 separated therefrom and not shown. The member 38 is provided with a unique coolant flow path and heat-transfer surfaces which includes a coolant inlet passage 80 which is in fluid flow receiving communication with the inlet conduit 30. More than one inlet conduit 30 may be provided as indicated by the numeral 30a. The conduits 30 and/or 30a may be suitable tubular members which are press or threadedly fitted into bores formed in the bottom edge 40d of the member 38 and open into the passage 80. As shown in FIG. 3, the passage 80 is in communication with a coolant distribution passage 82 by way of a connecting passage 80a. Passage 82 is in flow communication with plural, vertically extending, parallel coolant flow passages 83, preferably a total of fifteen, as indicated for the exemplary mold member 38. Each passage 83 is in communication with a coolant collection passage 84 extending generally parallel to passage 82 and which is in communication with a coolant discharge passage 85 by way of a coolant flow passage 83a. Passage 85 is in communication with the discharge conduit 32 and, as indicated in FIG. 3, an additional discharge conduit 32a may also be provided. Conduits 32 and/or 32a are also preferably formed as metal tubes which may be press or threadedly fitted into bores in the bottom edge 40d and which open into the discharge passage 85.

The passages 83 are separated by elongated, generally rectangular heat transfer bars 86 which are integrally formed in member 38 and are delimited also by the passages 82 and 84. As indicated in FIG. 3, the liquid coolant flow circuit provided by the coolant flow and collection passages just described includes a dam 88 which is dimensioned such that coolant flowing through the passages 83 will fill these passages as well as the passage 84 before coolant flows over the dam 88 and into coolant flow passage 83a. Accordingly, with the orientation of the coolant flow passages being such that the passages 83 extend generally vertically when the mold 16 is in its working position, it is important that all air and coolant vapor be purged from the passages 82, 83 and 84 and thereby also avoid the formation of pockets of trapped air or coolant vapor to prevent loss of heat exchange between the cavities 36a, 36b and the coolant flowing through the passages. The dam 88 ensures that this condition exists when coolant is introduced into the assembled molds 16.

Referring further to FIG. 3, a peripheral seal groove 90 is formed in the face or wall surface 41 of member 38 extending parallel to the side edges 40a, 40c, 40b and 40d and a second seal groove 92 is formed extending from dam 88 to groove 90 and which separates the passages 83a and 85 from the coolant flow circuit defined by the remainder of the passages described above.

Figure 6:
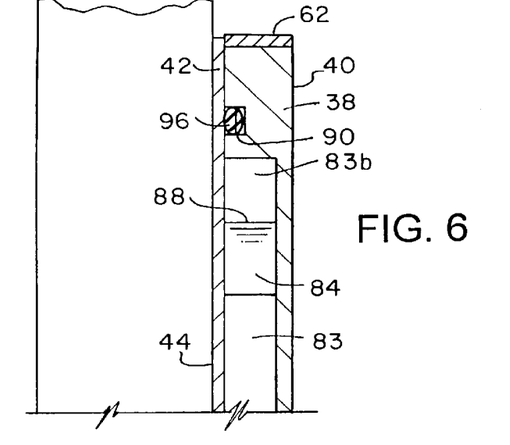
FIG. 6 is a detail section view of the assembled mold taken generally from the line 6—6 of FIG. 3.

Fastener receiving bores 38b are formed in the member 38 and are each provided with a concentric circumferential groove 94, see FIG. 3. The section views of FIGS. 5 and 6 further illustrate the way in which resilient, circular cross-section seal or gasket members 96, 98 and 100 are disposed in the peripheral groove 90, the groove 92 and the circumferential grooves 94, respectively, to form fluid-tight seals between the members 38 and 42 when they are assembled to each other. In this way short circuiting of coolant flow between passages 80, 82 and 83, in particular and the passages 83a and 85 is prevented. Still further, leakage from the coolant flow passages to the exterior of the member 37, comprising the assembly of the members 38 and 42, is also avoided. Referring to FIGS. 3 and 6, there is shown a connecting passage 83b between the passage 84 and the passage 83a which is defined by the dam 88 and between the members 38 and 42 when they are joined together.

The coolant flow passages described above are preferably integrally formed in the member 38. The member 38 may be a cast or molded member with the passages 80, 82, 83, 83a, 83b, 84 and 85 integrally formed therein or the passages may be machined into a metal plate comprising the member 38. Of course, the passages are closed and sealed by assembling the plate member 38 to the plate member 42 with the aforementioned resilient circular cross section gasket or seal members 96, 98 and 100 in their working positions within the corresponding grooves. Those skilled in the art will appreciate that other types of gasket or seal members may be provided for forming a substantially fluid tight joint between the members 38 and 42. However, by providing the seal or gasket members 96, 98 and 100 of commercially available materials to withstand operating temperatures of 275° F. to 500° F., for example, these seals will remain intact and can accommodate thermal expansion and contraction of the members 38 and 42 during the wax molding process with liquid coolant flowing therethrough.

Typically, when molding the type of wax described above, the molten wax temperature ranges from 120° F. to 180° F. The mold 16 described herein is, however, capable of operating at a temperature up to 400° F. to 500° F. for molding slabs or blocks of certain adhesives, for example. When operating at temperatures in the 400° F. to 500° F. range the seal members 96, 98 and 100 would be required to be formed of a material such as one sold under the trademark Viton, for example. Coolant compositions would typically be oil-ethylene glycol mixtures for operation at these higher temperature ranges.

The depth of the coolant flow passages in the member 38 is preferably about 0.38 inches if the member 38 has an overall thickness of 0.50 inches. Accordingly, substantial, relatively thin heat transfer surfaces are provided by the wall 40 and by the member 42 secured to member 38. The uniform heat transfer capability of the member 37 when configured as described and shown, and when using water or a water-ethylene glycol mixture as the liquid coolant is particularly advantageous and avoids forming molded wax slabs or blocks which are irregular in shape. The mold 16 provides uniform and rapid cooling and provides a significant reduction in the time required to mold wax slabs or blocks, i.e. from between about 2.50 hours to 3.0 hours with prior art molds down to about 1.0 hours for molds having the above-mentioned dimensions and features described.

Those skilled in the art will also recognize that the heat exchange bars 86 may be of different thicknesses and may be relatively thin in the manner of being characterized as fins. However, the uniform thickness of the bars with respect to the cross-sectional dimensions of the passages 83 is indicated to aid in providing for a reduced temperature gradient across the walls 40 and 44 so that the aforementioned wax slabs will cool and harden uniformly.

Those skilled in the art will also recognize that the passages 83, in particular, may be irregular in shape and have a serpentine or zigzag shape, for example. However, it is preferred that the passages 83 be substantially vertically oriented and provide parallel flow paths between the distribution passage 82 and the collection passage 84 so that uniform heat transfer across the faces defined by the walls 40 and 44 may be achieved. Still further, although the coolant medium described herein is preferably water or a similar liquid coolant, other coolant fluids may be used including fluids which may undergo a change of state as they flow through the coolant flow passages.

Figure 9:
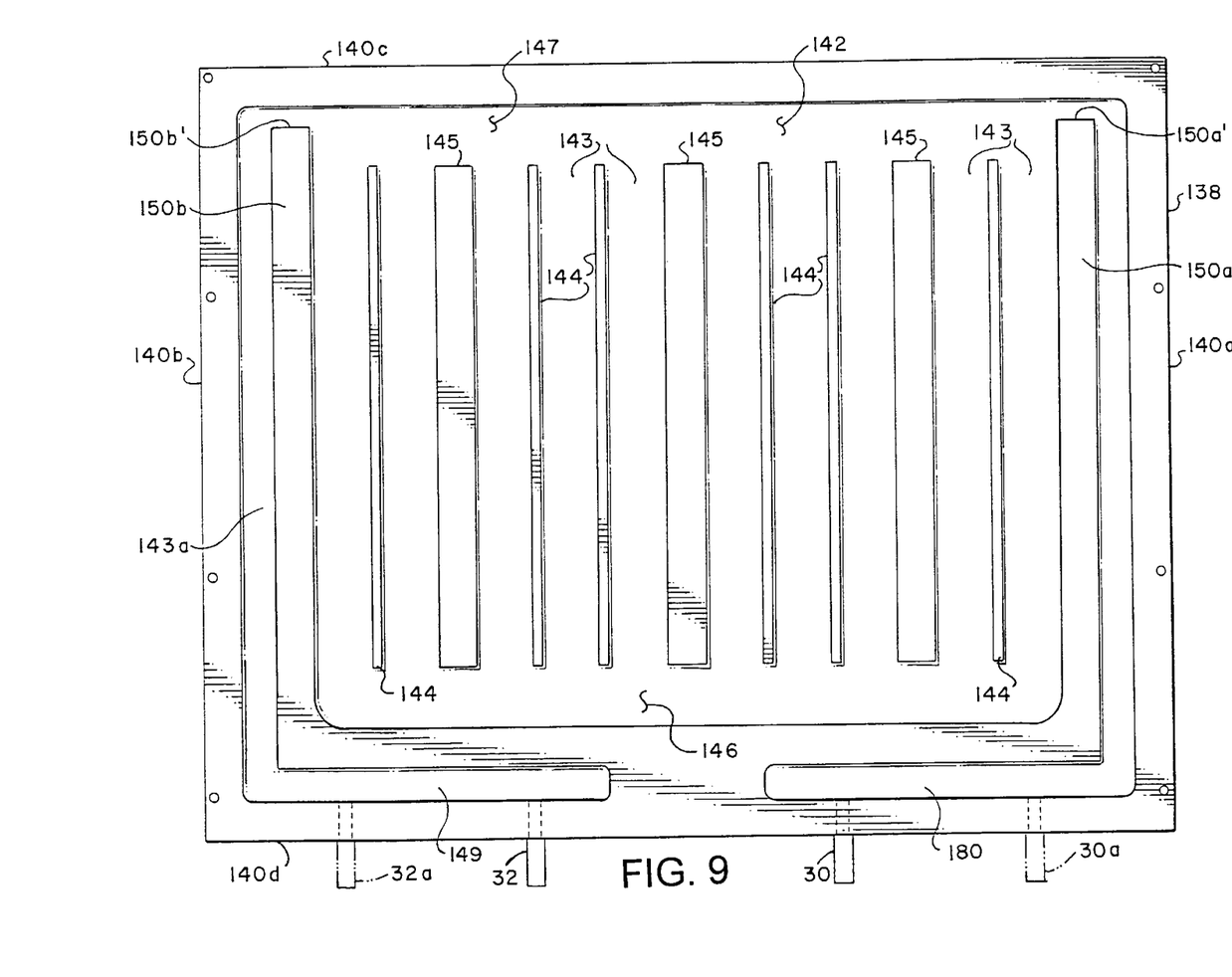
FIG. 9 is a plan view of an alternate embodiment of a plate for a heat transfer member showing another coolant flow passage arrangement.

Referring briefly to FIG. 9, an alternate embodiment of a heat transfer plate member in accordance with the invention is illustrated and generally designated by the numeral 138. The plate member 138 may have the same general configuration as the member 38 except for the arrangement of the coolant flow passages which are indicated by an inlet flow passage 180 operable to be in communication with coolant inlet conduits 30 and/or 30a. Passage 180 extends generally vertically along a side edge 140a of the member 138 and communicates with a coolant flow chamber 142 defined by spaced apart passages 143, which passages are separated by elongated, generally parallel heat transfer bars 144 and 145. Passages 143 interconnect generally horizontally extending passages 146 and 147. Passage 147 is in communication with a coolant discharge passage 149 by way of a final, generally vertically extending coolant flow passage 143a. Integrally formed flow separating and heat transfer bars 150a and 150b extend upward to distal end portions 150a' and 150b' to assure that coolant flow does not bypass the passages 143 as well as the connecting passages 146 and 147. The distal ends 150a' and 150 b' extend above the upper ends of the heat transfer bars 144 and 145 to provide respective dams to assure that the coolant flow passages are filled with coolant and have a substantially reduced tendency to trap air or coolant vapor within the passages 143 as well as the passages 146 and 147.

Another important advantage of the improved wax mold 16 is the ease with which the mold may be assembled, disassembled and replacement parts substituted for worn or damaged parts, thanks to the modular construction provided by the members 38, 42, 48, 50, 52, 54, 62 and 66, in particular. If any one of these members becomes damaged or, if a seal or gasket should fail and coolant leakage observed, the mold 16 may be easily disassembled and parts replaced, as needed, including the gasket or seal members 96, 98 and 100.

The construction and operation of the mold 16 is believed to be within the purview of one of ordinary skill in the art based on the foregoing description. However, briefly, the mold 16 may be fabricated of conventional engineering materials, such as aluminum or stainless steel for each of the parts described above except the seal members 96, 98 and 100 which may be formed of conventional elastomer materials used for high temperature o-ring type seals, for example. As indicated by the description above, the mold 16 may be easily assembled and disassembled to replace damaged component parts, and to facilitate cleaning of the mold surfaces provided by the members 38, 42, 48, 50, 52 and 54. Moreover, if either the handle assemblies 70 or the locating lugs or shoes 66 become damaged any of these components may be easily replaced, if needed. Of course, the wear or rub rail 62 may also be easily replaced when required.

Figure 8:
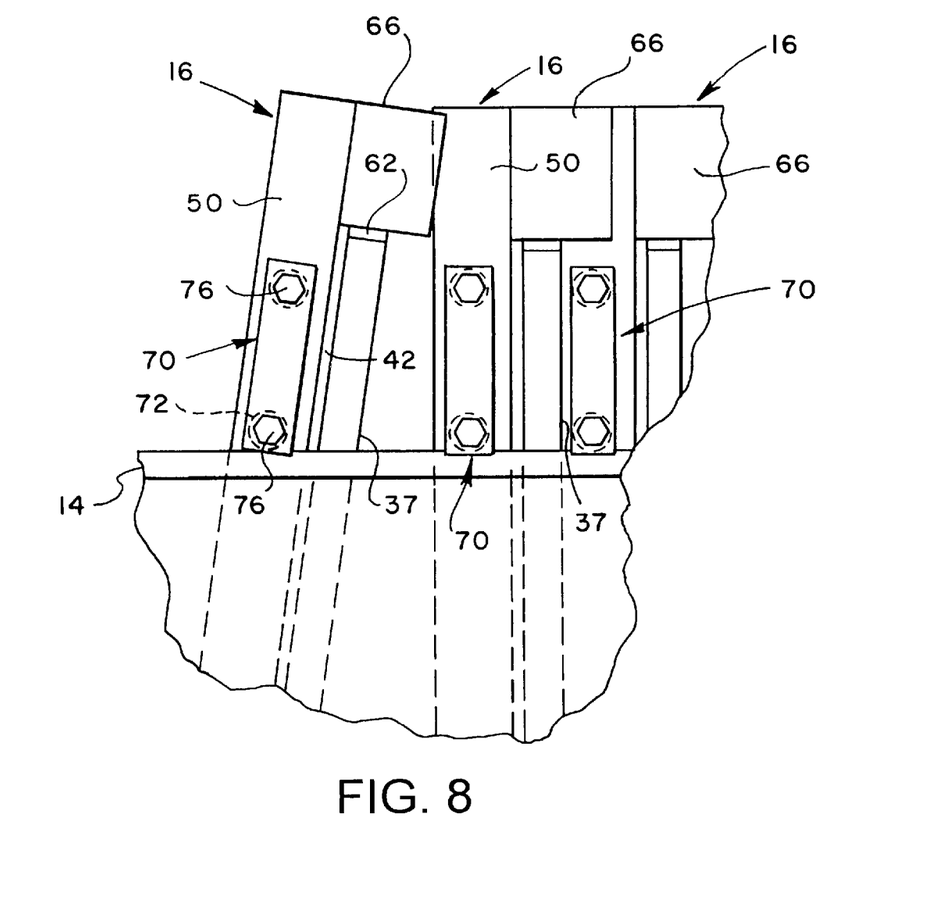
FIG. 8 is a detail side view of the apparatus of FIG. 1 showing a typical orientation of one of the molds when it has been separated from an adjacent mold.

When the molds 16 are assembled into the apparatus 10 and their respective coolant conduits 30 and 32 connected to the coolant hoses or conduits 26 and 28, liquid coolant may be circulated through the molds and, after the molds are pressed together by the press 33, 34, molten wax may be poured into the respective cavities 36a, 36b until the cavities are filled to the rub rails 62. If the cavities are slightly overfilled, a striking knife or blade, not shown, may be moved across the rub rails 62 to strike off any excess wax. When the wax has become sufficiently hardened and cooled the press plate 33 is retracted so that the molds 16 may be separated from each other and removed from the frame plates 12 and 14, if desired. In this regard, the flexible conduits 26 and 28 may be disconnected from the conduits 30 and 32 and reconnected when the molds are put back into the apparatus 10. Alternatively, the molds 16 may be separated in the apparatus, as shown in FIG. 8, sufficiently to allow wax slabs or blocks to be removed from the cavities 36a, 36b. In this regard, the placement of the handles 70 on the endwall members 48 and 50 is such that the handles are located off center and away from member 37. In this way the molds 16 will tilt so that the cavities 36a, 36b face slightly upward so that the wax slabs or blocks will not inadvertently fall out of the cavities 36a, 36b until the slabs or blocks can be grasped and removed, at will. Of course, any one of the molds 16 may be easily grasped by the handles 70 and removed from the apparatus 10 when required for repair or cleaning.

Although a preferred embodiment of a liquid cooled wax mold has been described herein, those skilled in the art will appreciate that various substitutions and modifications may be made without departing from the scope and spirit of the invention as recited in the appended claims.

What is claimed is:

1. A liquid-cooled wax mold comprising:
   a heat transfer member defining a cavity sidewall of said mold and a cavity sidewall of an adjacent mold;
   opposed endwall members and a bottomwall member connected to said heat transfer member and defining at least one mold cavity; and
   said heat transfer member comprising liquid coolant passages formed therein including a coolant inlet passage and a coolant discharge passage, a plurality of spaced apart, generally parallel heat transfer bars defining, in part, spaced apart generally parallel coolant flow passages, said flow passages extending generally vertically when said mold is disposed for receiving molten wax in said cavity, a generally horizontally extending coolant distribution passage disposed below said flow passages for conducting coolant from said inlet passage to each of said flow passages and a coolant collection passage disposed above said flow passages for receiving coolant from each of said flow passages and for conducting coolant to said discharge passage, said passages being configured to distribute flow of liquid coolant through said heat transfer member to flow generally vertically upwardly from said coolant distribution passage directly to said coolant collection passage to provide substantially uniform cooling of molten wax in said cavity.

2. The liquid-cooled mold set forth in claim 1 further comprising:
a dam interposed between said coolant discharge passage and said coolant collection passage, said dam purging air and coolant vapor from said coolant flow passages and said coolant collection passage when coolant is flowing through said mold.

3. The liquid-cooled mold set forth in claim 1 wherein:
said heat transfer member includes a first plate member including said coolant passages formed therein and a second plate member releasably connected to said first plate member and forming a closure over said coolant passages.

4. The liquid-cooled mold set forth in claim 3 wherein:
said first plate member includes a surface defining said sidewall of an adjacent mold cavity and said second plate member comprises a surface defining said sidewall of a cavity of said mold.

5. The liquid-cooled mold set forth in claim 3 wherein:
said first and second plate members are secured to each other by mechanical fasteners.

6. The liquid-cooled mold set forth in claim 5 wherein:
at least one of said first and second plate members includes a peripheral groove formed therein and said mold includes a resilient seal member disposed in said peripheral groove and forming a fluid-tight seal between said first and second plate members.

7. The mold set forth in claim 6 further comprising:
a further groove disposed in one of said first and second plate members and a resilient seal member disposed in said further groove and separating said coolant discharge passage from at least one of said coolant flow passages and said coolant distribution passage.

8. The liquid-cooled mold set forth in claim 3 wherein:
said endwall members and said bottomwall member are formed by respective elongated plate members, each being releasably secured to said heat transfer member by mechanical fasteners, at least selected ones of said fasteners being operable to secure said plate members of said heat transfer member together.

9. The liquid-cooled mold set forth in claim 8 wherein:
said endwall members and said bottomwall member are secured to said heat transfer member by socket head fasteners disposed in fastener receiving bores formed in said endwall members and said bottomwall member, respectively.

10. The liquid-cooled mold set forth in claim 1 further comprising:
opposed guide shoes mounted on said mold and operable to engage an adjacent mold for aligning said mold with said adjacent mold to close a cavity formed between said mold and said adjacent mold.

11. The liquid-cooled mold set forth in claim 1 further comprising:
opposed handles projecting from said endwall members, respectively, and operable to support said mold between opposed rail members of an apparatus for supporting said molds stacked side-by-side to form respective wax-receiving cavities in said molds, respectively.

12. The liquid-cooled mold set forth in claim 11 wherein:
said handles are offset from a sidewall of said mold to provide for tilting said mold in a direction to prevent molded members from falling out of said cavity when said mold is supported by said handles in a molding apparatus.

13. The liquid-cooled mold set forth in claim 1 further comprising:
coolant inlet and discharge conduits mounted on said heat transfer member along a bottom edge thereof and operable to be connected to liquid coolant supply and return conduits, respectively.

14. A liquid-cooled mold comprising:
a generally rectangular, planar heat transfer member including opposed, generally parallel sidewalls, at least one of said sidewalls defining at least part of a molding cavity of said mold, said heat transfer member including generally planar plate members releasably secured to each other to form liquid coolant passages therebetween including a coolant inlet passage, a coolant discharge passage and a plurality of coolant flow passages interconnecting said inlet and discharge passages to provide for flow of liquid coolant substantially uniformly between said sidewalls;
opposed endwall members and a bottomwall member, each including plural fastener receiving bores formed therein;
a plurality of mechanical fasteners disposed in said bores in said endwall members and said bottomwall member for securing said endwall members, said bottomwall member and said plate members of said heat transfer member in assembly to provide a mold cavity, and
said coolant inlet passage, said coolant discharge passage and said coolant flow passages are formed as recesses in one of said plate members of said heat transfer member and the other of said plate members comprises opposed parallel planar wall surfaces and is releasably secured to said one plate member to form a closure over said recesses to define a flowpath for coolant through said heat transfer member.

15. The liquid-cooled mold set forth in claim 14 wherein:
at least one of said plate members includes a peripheral seal member receiving groove disposed in one face of said plate member for receiving an elongated resilient seal member, said seal member being operable to provide a fluid tight seal when said plate members are assembled to prevent leakage of coolant from said mold.

16. The liquid-cooled mold set forth in claim 14 wherein:
said coolant flow passages are formed in said heat transfer member to extend generally vertically when said mold is oriented in a working position for receiving molten material in said at least one cavity and said coolant flow passages are interposed between a coolant distribution passage and a coolant collection passage formed in said heat transfer member for conducting coolant to and from said coolant flow passages, respectively.

17. A liquid-cooled wax mold comprising:

a generally rectangular, planar heat transfer member formed of two separable plate members, said heat transfer member including coolant passages formed substantially entirely in one of said plate members including a coolant inlet passage, a coolant discharge passage, a plurality of parallel coolant flow passages extending, generally vertically when said mold is oriented in a working position for receiving molten wax and coolant distribution and collection passages in communication with said coolant flow passages and said inlet and discharge passages, respectively, the other of said plate members comprising a generally planar wall surface and being releasably secured to said one plate member to form a closure over said passages whereby said passages are operable for conducting liquid coolant through said heat transfer member to provide substantially uniform cooling of molten material in said mold;

a pair of opposed endwall members releasably securable to said heat transfer member;

a bottomwall member extending between said endwall members and releasably securable to said heat transfer member;

one of said plate members of said heat transfer member, said endwall members and said bottom wall member defining at least one mold cavity and said plate members, said endwall members and said bottomwall member being connected to each other by a plurality of threaded fasteners to provide for holding said mold in assembly and being operable to provide for disassembling said members from each other for cleaning, replacement or repair.

18. The mold set forth in claim 17 wherein:

one of said plate members includes a peripheral groove formed therein for receiving a resilient seal member for sealing engagement with the other of said plate members when said plate members are assembled to form said heat transfer member and to prevent leakage of liquid coolant from said coolant passages out of said mold.

19. The mold set forth in claim 17 including:

opposed mold locating shoes mounted on said endwall members and including guide surfaces formed thereon for guiding said mold into registration with an adjacent mold in a mold apparatus to align said mold with said adjacent mold to form a mold cavity therebetween for receiving molten wax.

20. The mold set forth in claim 17 further comprising:

opposed support handles for said mold connected to said endwall members, respectively, for supporting said mold between opposed support rails in a molding apparatus.

21. The mold set forth in claim 17 further comprising:

a separable rub rail member releasably secured to one side edge of said heat transfer member adjacent a cavity opening in said mold.

22. A liquid-cooled wax mold comprising:

a heat transfer member defining a cavity sidewall of said mold and a cavity sidewall of an adjacent mold;

opposed endwall members and a bottomwall member connected to said heat transfer member and defining at least one mold cavity;

said heat transfer member comprising liquid coolant passages formed therein including a coolant inlet passage and a coolant discharge passage, said liquid coolant passages being configured to distribute flow of liquid coolant through said heat transfer member to provide substantially uniform cooling of molten wax in said cavity; and opposed handles projecting from said endwall members, respectively, and operable to support said mold between opposed rail members of an apparatus for supporting said molds stacked side-by-side to form respective wax-receiving cavities in said molds, respectively, said handles are offset laterally from said heat transfer member such that said mold will tilt when supported on said rail members and disengaged from an adjacent mold in a direction to prevent molded members from falling out of said cavity when said mold is supported by said handles in said apparatus.

23. A liquid-cooled wax mold comprising:

a heat transfer member defining a cavity sidewall of said mold and a cavity sidewall of an adjacent mold;

opposed endwall members and a bottomwall member connected to said heat transfer member and defining at least one mold cavity;

said heat transfer member including a coolant inlet passage and a coolant discharge passage, a plurality of spaced apart, generally parallel heat transfer bars defining, in part, spaced apart generally parallel coolant flow passages, said flow passages extending generally vertically when said mold is disposed for receiving molten wax in said cavity, a generally horizontally extending coolant distribution passage in fluid communication with said coolant flow passages at one end thereof, respectively, and a generally horizontally extending coolant collection passage in fluid communication with said coolant flow passages at an opposite end thereof, respectively, said liquid coolant passages being configured to distribute flow of liquid coolant through said heat transfer member to provide substantially uniform cooling of molten wax in said cavity; and a dam interposed between said coolant discharge passage and said coolant collection passage, said dam purging air and coolant vapor from said coolant flow passages and said coolant collection passage when coolant is flowing through said mold.

\* \* \* \* \*